Jan. 17, 1933. A. B. STARR 1,894,430
TOASTER DEVICE
Filed Feb. 17, 1930 3 Sheets-Sheet 1

INVENTOR
Alden B. Starr
BY
ATTORNEY

Jan. 17, 1933. A. B. STARR 1,894,430
TOASTER DEVICE
Filed Feb. 17, 1930 3 Sheets-Sheet 2

INVENTOR
Alden B. Starr
BY
ATTORNEY

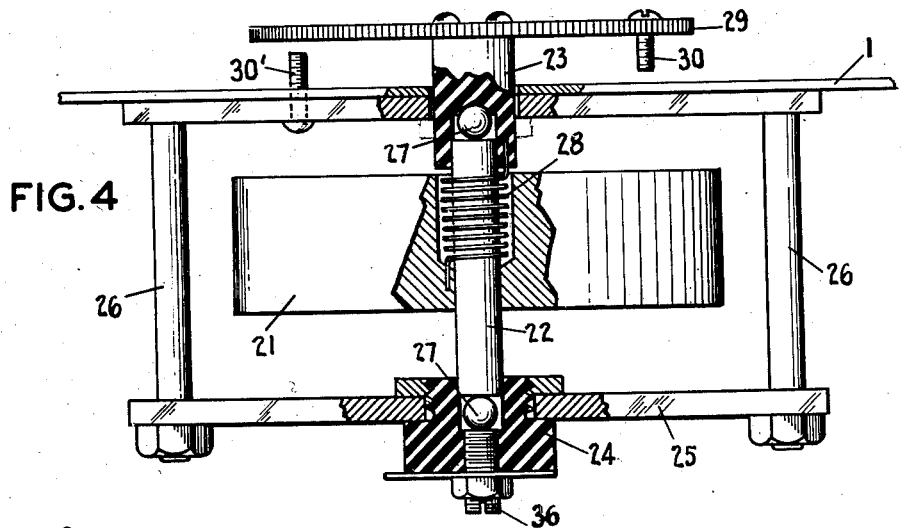
FIG. 4
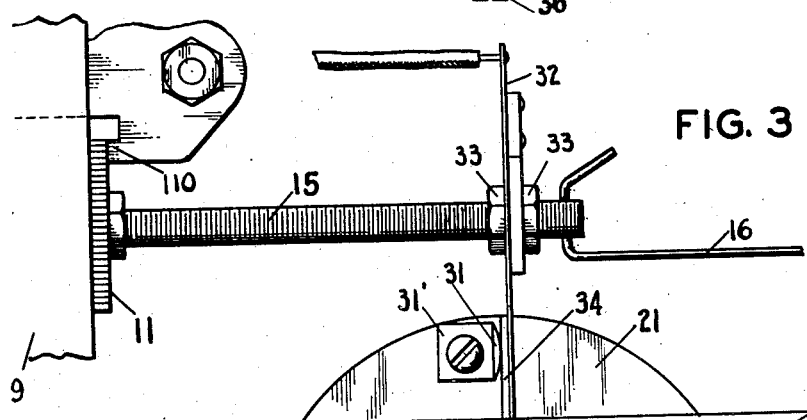
FIG. 3
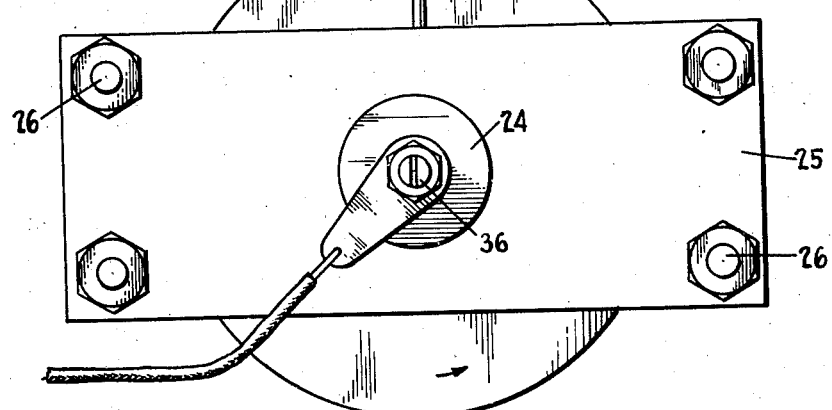

Patented Jan. 17, 1933

1,894,430

UNITED STATES PATENT OFFICE

ALDEN B. STARR, OF BROOKLYN, NEW YORK, ASSIGNOR TO KNAPP-MONARCH COMPANY, CORPORATION OF MISSOURI

TOASTER DEVICE

Application filed February 17, 1930. Serial No. 429,088.

My invention relates to heating appliances, and more particularly to toaster devices of the conveyor type.

It is one object of my invention to provide a new and improved means for the actuation of the aforesaid conveyor.

Another object of my invention is to provide in conjunction with an intermittently acting motor for driving said conveyor a control for the motor, the amplitude of which is varied without varying the length of the strokes or pulsations of said motor.

A further object of my invention is the provision of a new and simplified actuating device for a conveyor toaster, in which a simple electromagnetic drive is provided and adapted to a uniform length of stroke, but occurring at variable intervals, according as more or less toasting or heating effect is desired.

A still further object of my invention is to provide a circuit making and breaking device in which the contact for completing the circuit is made at a different place from the point of separation or breaking of the circuit.

My invention provides a toaster of the conveyor type in which the conveyor chain is driven by a simple electromagnet and pawl and ratchet structure, means being provided for cyclically energizing and deenergizing the electromagnet to produce strokes of the armature therein, to move the ratchet, and thus the sprocket carrying the conveyor chain is rotated. There is further provided means for the adjustment of the rate at which the cyclic energizations of the electromagnet are caused to occur.

Other objects and the structural details of my invention will be apparent from the accompanying drawings when read in connection with the following description, wherein—

Fig. 3 is a view on a larger scale of the balance wheel control mechanism of my invention; and Fig. 4 is a vertical view partially in section, of the balance wheel mounting and the adjustment therefor.

Figure 1:
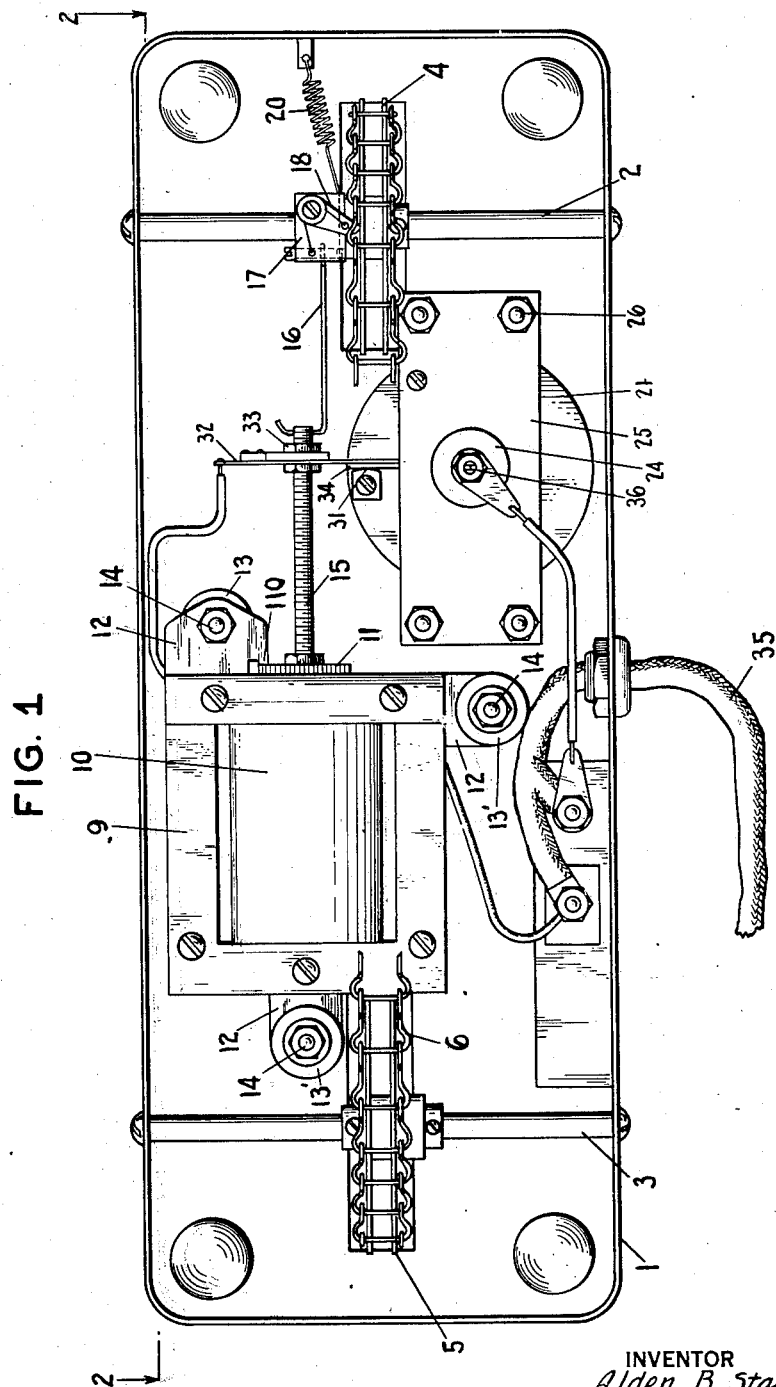
Figure 1 is a bottom view of an embodiment of my invention, the bottom plate being removed.
Figure 2:
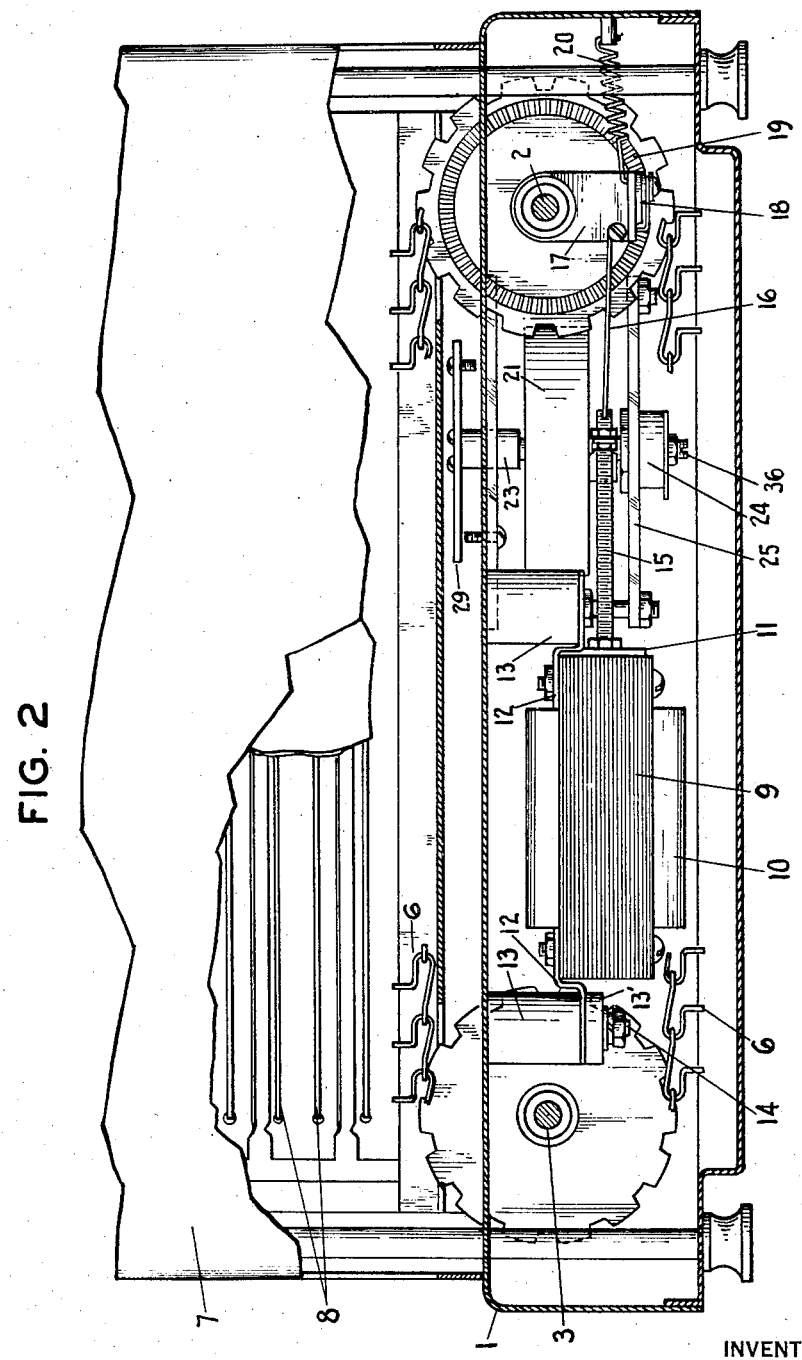
Fig. 2 is a view in vertical section on the line 2—2 of Fig. 1, parts being broken away to facilitate illustration.

Referring to the drawings, I provide a foundation base 1, within which are mounted shafts 2 and 3 respectively carrying sprocket wheels 4 and 5, upon which is mounted a conveyor chain 6.

Upon the foundation base 1, is mounted a housing 7 in which opposed heat producing resistors 8 are mounted together with appropriate guides for the bread as the conveyor chain 6 moves the same between heaters 8. As these portions of a toaster may be of any suitable form well known in the art, only the broken away portions thereof are shown in the drawings in this application.

I provide an electromagnet having a frame 9 having a coil or winding 10 and an armature or plunger 11, this structure being well known in the art. The frame 9 is supported within the base 1, in any convenient way, as by ears 12, secured to the frame and mounted between resilient collars 13, 13', which are supported upon bolts 14 fastened to the base 1. Proper alignment of the electromagnet and mechanism is obtained through adjustment of the pressure upon the respective collars 13, 13'.

The armature member 11 is provided with an extension rod or arm 15, as shown, to which is attached a link 16. The link 16 is in turn attached to a swinging arm member 17, that is journaled upon the shaft 2, and carries a pawl 18 adapted to cooperate with a circle of ratchet teeth 19 that are cut upon one face of the sprocket wheel 4. A spring 20 serves to pull the arm member 17 away from the magnetic structure 9, until the link 16 and the rod 15 draw the armature 11 against the stop 110. This stop may be an ear projecting from the clamp for the frame of the electromagnet and bent so as to project in the path of the armature.

A fly wheel or balance wheel 21 is provided having a shaft 22, which is pivotally mounted in upper and lower bearings 23 and 24, the bearings 23 being desirably mounted in the material of the base 1, and the bearing 24 being carried by an auxiliary plate 25, supported from the base 1 by bolts 26. Ball-bearing members 27 are located at the ends of the shaft and are provided as part of the bearings 23 and 24 as shown in detail in Fig. 4. A control spring 28 surrounds the shaft 22 and is desirably positioned within a recess in the balance wheel 21, one end of the spring being attached to the balance wheel, and the other end being attached to the bearing 23.

The bearing 23 is arranged so as to be adjustable by rotation about its axis, and thereby serves to bring the spring 28 under more or less tension. For this purpose, the position of the bearing 23 may be adjusted by means of disc 29 rigidly connected to the bearing. Disc 29 is located above the base 1 where it is accessible to the user for adjustment as hereinafter described. The disc is provided with a depending lug 30 cooperating with an upstanding stop 30' to limit the movements of the disc 29.

An adjusting screw 36 is desirably provided within the body of the bearing 24 for taking up any play in the bearings on the shaft 22, and to insure good electrical contact therethrough as will now be explained.

Upon the balance wheel 21 is positioned a contact 31, the contact being firmly fastened thereto by screw and block 31' as shown. A member 32, formed of slightly resilient spring material, is supported between lock nuts 33 upon the rod 15 that is attached to the armature 11. The member 32 extends over the surface of the balance wheel member 21, and there has mounted a contact 34, adapted to cooperate with the contact 31.

Suitable electrical connections are provided between the power supply cable 35 and the electromagnet winding 10, one of the terminals thereof being connected to the contact 34, and the other power circuit lead being connected to the contact 31 through the balance wheel 21 and the bearing 24.

In the operation of my device, the electric circuits will extend from the source of power through the cable 35, to the heater elements 8 to provide the necessary heat to toast the material that may be fed between the heater elements. Simultaneously, current flows through the coil 10, and the contacts 34 and 31, which are normally closed, thereby energizing the coil 10 and exerting a pull upon the armature 11, tending to draw it within the coil. This movement pulls arm 15, link 16, swinging arm 17 and pawl 18. Engagement of the pawl 18 with one of the teeth 19 upon the sprocket 4 moves the sprocket by an amount which may desirably be one tooth. This movement is simultaneously communicated to the contacts 31 and 34 and applies force to the balance wheel 21, causing a rotation thereof upon its bearings in the direction of the arrow in Fig. 4. Just before, or just as the armature 11 has completed its stroke, the impulse applied to the contact 31 has imparted a substantial amount of kinetic energy to the balance wheel 21, and it therefore continues to revolve beyond the point of movement of arm 32 and contact 34. This movement will continue and will wind or contract the spring 28 until the entire amount of kinetic energy has been absorbed by the spring. As soon as the contacts 31 and 34 are separated the circuit of coil 10 is separated, causing the deenergization of the electromagnet, and allowing the armature 11 to be drawn back to its original position, against its stop, by the pull of the spring 20.

When the kinetic energy in the wheel 21 has been transferred to tension in the spring 28, the wheel 21 stops, and the spring returns it to its original position, thereby reclosing the contacts 31 and 34, re-energizing the coil 10 and the frame 9, to cause a pull to be exerted upon the armature 11 whereupon the previously described cycle of operations occurs. Each movement of the armature 11 is in the nature of an impulse which communicated to the ratchet 18, 19, advances the sprocket member 4 by one tooth for each impulse, and traverses the chain 6 between the heater elements 8. The toastable material is placed upon the chain and carried thereby between heaters 8 so as to be toasted appropriately, and thereafter carried to a point of discharge from the machine.

In order to adjust the rate of travel of the conveyor chain, in order to obtain light, medium or dark toast as the user desires, I arrange that the period of movement of the fly wheel 21 and therefore the periodicity of making and breaking contact may conveniently be adjusted by varying the tension of the spring 28 so as to set it for whatever condition is desired. This adjustment of spring tension is conveniently obtained by rotation of the disc member 29 to rotate the bearing 23. When the spring tension of the spring 28 is substantially high, the kinetic energy imparted to the balance wheel 21 is rather quickly absorbed by the spring 28. Therefore, the travel of the wheel 21 and the contact 31 after separation from the contact 34 is short, so that the return of the wheel and contact occurs in a comparatively short time under the urge of the spring 28. In consequence the successive cycles of energization of the electromagnet occurs at a relatively high rate so that the chain 6 is rapidly traversed carrying the toastable material through the toaster in a relatively short time, and thus producing comparatively light toast. Alternatively, the tension of the spring 28 may be reduced by appropriate movement of the disc 29, whereupon a substantially greater travel of the fly wheel 21 occurs before its kinetic energy is absorbed by the spring 28, and thereafter the spring returns the fly wheel to its original position after a comparatively long interval, thus causing the successive cycles of operations to occur in a longer period of time, and traversing the chain 6 at a slower rate of speed, thus enabling the production of darker toast. It is of course obvious that intermediate spring tensions may be obtained by appropriate adjustment of disc 29, and thereby intermediate degrees of darkness or lightness in the toast.

By the arrangement and balance of the making and breaking of the circuit to the electromagnet and the stroking of the armature, I provide an arrangement that is especially quiet as to the operation of the electromagnet. Noise in operation of electromagnets is caused to a large degree to the improper or imperfect seating of the armature upon its stop thus making it susceptible to the alternating cycles of the energizing current flowing during the time of the seating. With my arrangement the circuit is broken just before or just as the armature is seated so that when the armature stroke is completed no current is flowing in the electromagnet. Hence, no noise or "hum" or "singing" is obtained with my arrangement.

Another advantageous feature of my invention as shown in this embodiment, is the high durability and reliability of operation obtained by the particular design of the contacts 31 and 34. It will be noted that contact 31 is beveled or rounded, and as the contact 34 moves along a straight line, the contact 31 follows an arc as the fly wheel 21 revolves so that the relative point of contact between the two contacts continually shifts from a point near the rod 15 to a point further away therefrom. Thus a particularly advantageous rubbing action is obtained between the contacts aiding in keeping them clean. Furthermore, the actual separation of the contacts occurs at a point of substantial distance away from the rod 15, and at one end of the contact 34. On the other hand, because the contact 34 is returned to its normal position before the contact 31 is returned, and the circuit is completed when the contacts are in that normal position, the point of engagement is at a point on the contact 34 substantially nearer the rod 15 than the corner of separation just described. Hence the point of engagement is different from and remote from the point of separation of the contacts 31 and 34. Thus any destruction or wear of the contacts due to arcing occurs at a point where it will not interfere with the making of the circuit between the contacts at the end of the return stroke of the balance wheel 21. In this way an unusually long life of the contacts is obtained, and a very high degree of reliability of operation.

It will be observed that by this embodiment of the device of my invention, I am enabled to obtain a variation in speed of travel of material through the machine by a variation in the time of a cyclic traversing device, each cycle however advancing the chain by a uniform amount.

By the device of my invention I have thus obtained a new, rugged, simple and convenient toaster device, in which a highly advantageous drive actuates the traversing chain, and in which means are provided for the simple and convenient adjustment of the rate of travel of the conveyor chain.

Certain subject matter is shown but not claimed herein, the same being covered in my copending application, Ser. No. 433,472, filed Mar. 5, 1930 (Case A-55).

While I have shown but a single embodiment of the device of my invention, it is adapted to still other modifications therefrom without departure from the spirit thereof, and such modifications are intended to be covered by the appended claims.

I claim:

1. In combination, a conveyor, electromotive power driving means therefor, and a recurrent period control therefor comprising an oscillatory balance wheel, a movable bearing therefor, a spring connected between the bearing and balance wheel and put under tension by oscillations of the balance wheel, and means for moving the bearing about the axis of said balance wheel to adjust the tension of said spring.

2. A conveyor device comprising a conveyor chain, a sprocket wheel therefor, a pawl and ratchet cooperating therewith, an electromagnetic drive therefor having a part adapted for a vibratory motion and an electromagnet, a circuit interrupter in circuit with the electromagnet for producing said vibratory motion and comprising an oscillatory balance wheel, a contact controlled by said balance wheel, and a second contact attached to a portion of said vibratory structure and cooperating with said first mentioned contact, and means for adjusting the period of vibration of said interrupter.

3. A conveyor device comprising a conveyor chain, a sprocket wheel therefor, a pawl and ratchet cooperating therewith, an electromagnetic drive having a portion adapted for a vibratory motion and an electromagnet, a circuit interrupter in circuit with the electromagnet for producing said vibratory motion and comprising a balance wheel having a contact mounted thereon, a second contact attached to the vibrating portion of said drive and cooperating with the first mentioned contact, linkage between said ratchet mechanism and said vibratory portion, and means for varying the periodicity of the engagement of said contacts by varying the operation of the balance wheel.

4. A conveyor device comprising a conveyor chain having a sprocket wheel therefor, a pawl and ratchet cooperating therewith, an electromagnetic drive therefor having a portion adapted for a vibratory motion and an electromagnet, a circuit interrupter in circuit with the electromagnet for producing said vibratory motion and comprising said oscillatory balance wheel having a contact mounted thereon, a spring put under tension by oscillations of the balance wheel, and a second contact attached to a part of said vibratory structure and cooperating with said first mentioned contact, means for adjusting the period of vibration of said drive, comprising means for adjusting said spring whereby the tension thereof may be increased or decreased.

5. A conveyor, an electromagnetic drive therefor having a portion adapted for a vibratory motion and an electromagnet, a circuit interrupter in circuit with the electromagnet for producing said vibratory motion and comprising an oscillatory balance wheel having a contact mounted thereon, and a second contact attached to the vibratory portion of said magnet structure and moving in a straight line in cooperating with the first mentioned contact to control the circuit therethrough.

6. A circuit interrupter comprising a rotary member, a contact mounted thereon, and a second contact having means to effect straight line movement thereof in a direction normal to the contacting surface thereof to cause said contacts to engage each other and so as to cause a wiping action thereof in the traverse thereof, and so that separation thereof occurs at a point different from the point at which main contact is made.

7. In a toaster device, opposed heaters, a conveyor chain moving therebetween, sprockets for the support thereof, an electromagnetic drive for periodically moving the conveyor comprising a magnetic frame, a coil mounted therein, an armature moved by said coil, a pawl and ratchet mechanism cooperating with said sprockets, linkage between said magnet armature and said ratchet mechanism, means for the cyclic opening and closing of the circuit to said coil comprising a balance wheel having a control spring, a contact mounted thereon, and a second contact mounted upon said linkage and cooperating with said first mentioned contact to impart impulses to said balance wheel and make and break the circuit through said contacts.

8. In a toaster, opposed heating elements, a conveyor chain moving therebetween, sprockets for the support thereof, a pawl and ratchet mechanism cooperating with the sprockets, an electromagnet having a movable armature, a rod on said armature, a link between the rod and the pawl and ratchet mechanism, a resilient arm carried by said rod, a contact in circuit with the electromagnet and carried by the arm, a balance wheel having a control spring and a contact mounted thereon and extending in position to engage the first mentioned contact when the parts are at rest, whereby the electromagnet is energized thus moving the armature to impart an impulse to said balance wheel, the contacts separating substantially as the armature reaches the limit of its movement, a spring for returning the armature and its contact to starting position, the balance wheel spring returning its contact also to starting position whereupon the circuit to the electromagnet is reestablished and the above cycle of operations is repeated.

9. In a toaster, opposed heating elements, a conveyor chain moving therebetween, sprockets for the support thereof, a pawl and ratchet mechanism cooperating with the sprockets, an electromagnet having a movable armature, a rod on said armature, a link between the rod and the pawl and ratchet mechanism, a resilient arm carried by said rod, a contact in circuit with the electromagnet and carried by the arm, a balance wheel having a control spring and a contact mounted thereon and extending in position to engage the first mentioned contact when the parts are at rest, whereby the electromagnet is energized thus moving the armature to impart an impulse to said balance wheel, the contacts separating substantially as the armature reaches the limit of its movement, a spring for returning the armature and its contact to starting position, the balance wheel spring returning its contact also to starting position whereupon the circuit to the electromagnet is reestablished and the above cycle of operations is repeated, and means for varying the periodicity of the balance wheel operations so as to vary the periodicity of the cycle of operations.

10. In a constant vibratory system, a balance wheel, a spring cooperating therewith, an electromagnet for the actuation of the balance wheel, a contact on said balance wheel and a second contact for coaction therewith, said second contact being moved by said electromagnet whereby movement of said second contact is transmitted through said first contact to said balance wheel.

In testimony whereof I affix my signature.

ALDEN B. STARR.